(12) United States Patent
Calvert (10) Patent No.: US 8,905,449 B2
(45) Date of Patent: Dec. 9, 2014

(54) CARIBINER

(71) Applicant: Chris Calvert, Gilbert, AZ (US)

(72) Inventor: Chris Calvert, Gilbert, AZ (US)

(*) Notice: Subject to any disclaimer, the term of this patent is extended or adjusted under 35 U.S.C. 154(b) by 217 days.

(21) Appl. No.: 13/670,442

(22) Filed: Nov. 6, 2012

(65) Prior Publication Data

US 2014/0123447 A1   May 8, 2014

(51) Int. Cl.
*F16B 45/02* (2006.01)
*F16B 45/00* (2006.01)
*B66C 1/36* (2006.01)

(52) U.S. Cl.
USPC .... 294/82.31; 24/599.1; 24/599.8; 294/82.19

(58) Field of Classification Search
CPC ......... F16B 45/025; F16B 45/04; B63C 1/36; B66C 1/36; B66C 1/26
USPC ........... 24/581.11, 606, 611, 619, 636, 599.1, 24/599.8; 294/82.31, 82.33, 82.19
See application file for complete search history.

(56) References Cited

U.S. PATENT DOCUMENTS

| 653,021 | A | * | 7/1900 | Hamilton | 114/230.26 |
| 4,195,872 | A | * | 4/1980 | Skaalen et al. | 294/82.19 |
| 4,751,892 | A | * | 6/1988 | Sechel et al. | 114/221 R |
| 5,538,303 | A | * | 7/1996 | Dunham | 294/82.31 |
| 8,327,788 | B1 | * | 12/2012 | Cardarelli et al. | 114/230.26 |
| 8,443,747 | B1 | * | 5/2013 | Cardarelli et al. | 114/221 R |

* cited by examiner

Primary Examiner — Jack W Lavinder
(74) Attorney, Agent, or Firm — Greg L. Martinez (57) ABSTRACT

A carabiner includes a carabiner body, and a gate assembly coupled to the carabiner body. The carabiner includes a sleeve bracket, which includes first and second sleeve bracket bodies coupled to the gate assembly, and a stationary bracket, which includes first and second stationary bracket bodies coupled to a distal portion of the carabiner body. An elongate member extends through the sleeve bracket and stationary bracket, wherein the gate assembly is moveable between open and closed conditions in response to apply a force to the elongate member.

19 Claims, 14 Drawing Sheets

CARIBINER

BACKGROUND OF THE INVENTION

1. Field of the Invention

This invention relates generally to hand and hoist-line implements.

2. Description of the Related Art

There are many different types of hand and hoist-line implements, such as a carabiner. Carabiners are often used with ropes for activities, such as climbing and hoisting. Examples of carabiners can be found in U.S. Pat. Nos. 4,811, 467, 5,005,266, 5,210,914, 5,463,798, 6,588,076 and 6,715, 898. A carabiner includes a gate, which is typically manually opened and closed by a person who moves the gate with his or her hand. There are many different types of gates that can be included with a carabiner, such as a non-locking gate and a locking gate. Examples of non-locking gates include a straight gate, wire gate and oval gate. Examples of locking gates include a screw-lock gate and a twist-lock gate. A twist lock gate can be unlocked by a person who twists as spring-loaded sleeve. The twist lock gate is locked in response to the person letting go of the sleeve so that it springs back into place to lock the gate. One problem with locking and unlocking a typical twist-lock gate is that the person has to be able to reach it with his or her hand.

BRIEF SUMMARY OF THE INVENTION

The present invention is directed to a carabiner which can be locked and unlocked remotely. The novel features of the invention are set forth with particularity in the appended claims. The invention will be best understood from the following description when read in conjunction with the accompanying drawings.

BRIEF DESCRIPTION OF THE DRAWINGS

It should be noted that like reference characters are used throughout the various views of the Drawings.

DETAILED DESCRIPTION OF THE INVENTION

Figure 1A:
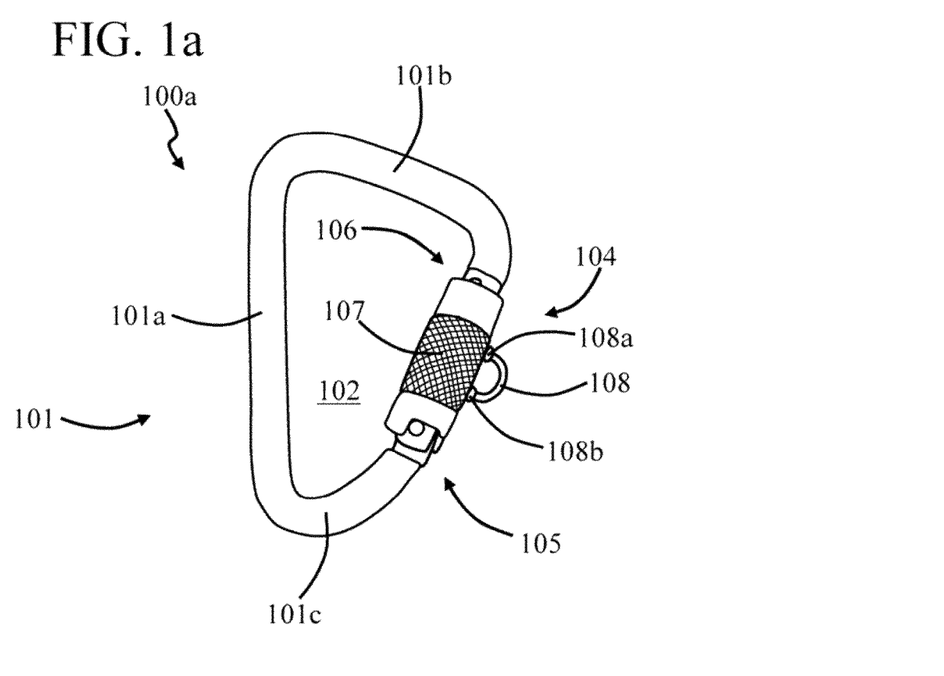
FIGS. 1a and 1b are opposed side views of one embodiment of a carabiner.
Figure 1B:
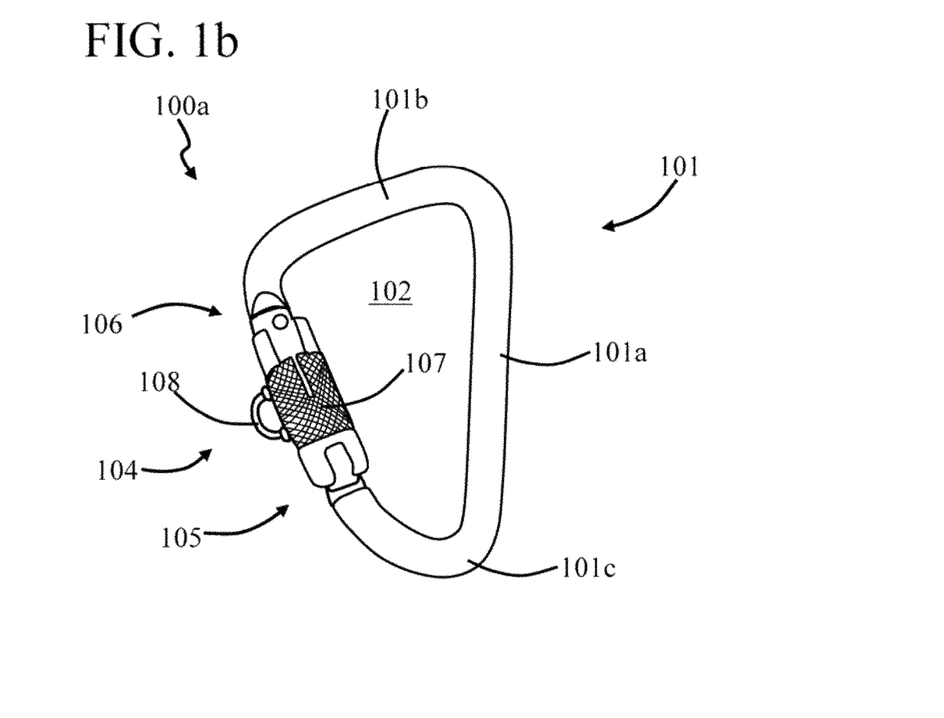
Figure 1C:
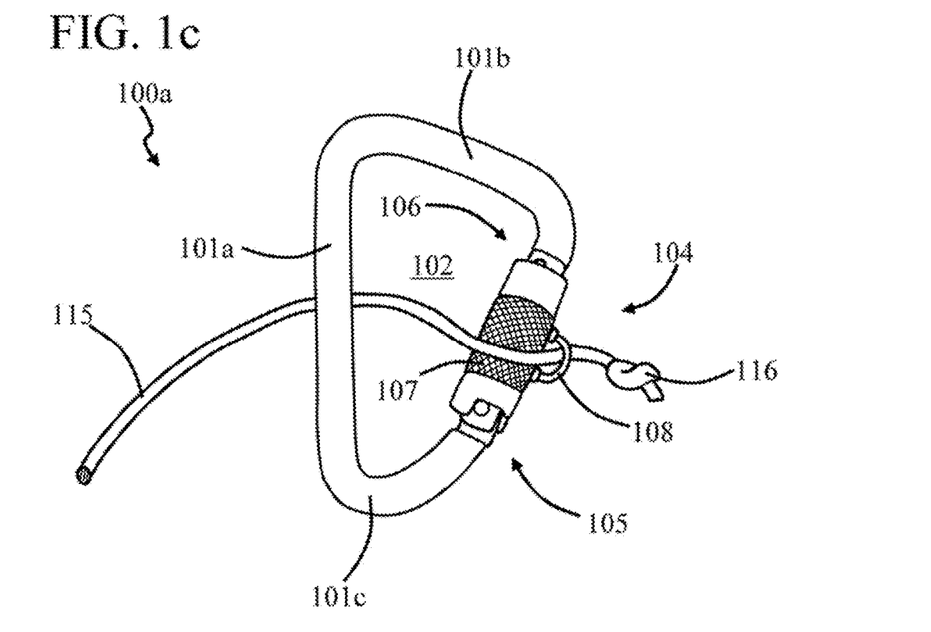
FIGS. 1c and 1d are side views of the carabiner of FIGS. 1a and 1b in closed and open conditions, respectively.
Figure 1D:
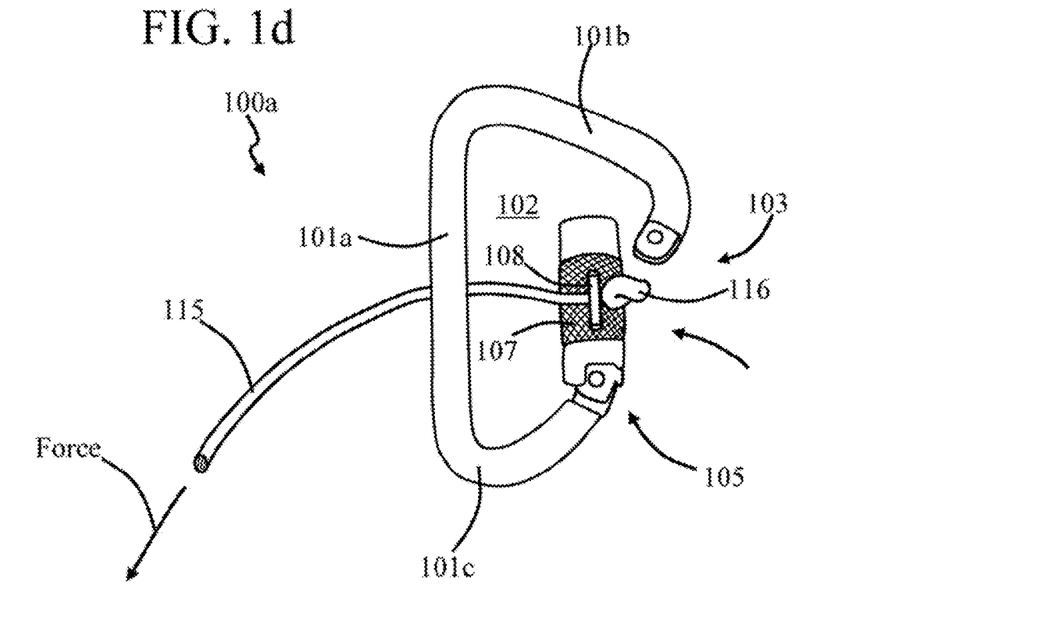

FIGS. 1a and 1b are opposed side views of one embodiment of a carabiner 100a, and FIGS. 1c and 1d are side views of carabiner 100a in closed and open conditions, respectively. In this embodiment, carabiner 100a includes a carabiner body 101 having a distal portion 101a, upper portion 101b and tower portion 101c. Carabiner body 101 bounds a body opening 102.

Carabiner 100a includes a gate assembly 104, which is carried by carabiner body 101. Gate assembly 104 extends between upper portion 101b and lower portion 101c, and is opposed to distal portion 101a. Gate assembly 104 includes a pivot portion 105, which is pivotably coupled to lower portion 101c. Gate assembly 104 includes a latch portion 106, which is repeatably moveable between latched and unlatched conditions with upper portion 101b. Gate assembly 104 is repeatably moveable between closed and unclosed conditions with carabiner body 101. Gate assembly 104 is shown in the closed condition in FIGS. 1a, 1b and 1c, and gate assembly 104 is shown in the open condition in FIG. 1d. In the closed condition, latch portion 106 is latched with upper portion 101b and, in the open condition, latch portion 106 is unlatched with upper portion 101b. It should be note that gate assembly 104 moves through body opening 102 when in the open condition.

Gate assembly 104 can be of many different types. In this embodiment, gate assembly 104 is a spring-loaded gate assembly, which includes a twistable sleeve 107. Sleeve 107 is repeatably moveable between biased and unbiased conditions in response to rotating sleeve 107. In the unbiased condition, gate assembly 104 is in the closed condition and latch portion 106 is latched to upper portion 101b. In the biased condition, gate assembly 104 is in the open condition and latch portion 106 is unlatched with upper portion 101b.

In this embodiment, carabiner 100a includes a loop 108, which is carried by gate assembly 104. Loop 108 can be carried at many different positions. In this embodiment, loop 108 is coupled to gate assembly 104. In particular, loop 108 is coupled to sleeve 107. Loop 108 can be coupled to sleeve 107 in many different ways. In this embodiment, loop 108 is coupled to sleeve 107 by weldments 108a and 108b. Loop 108 is positioned so it extends away from body opening 102. It should be noted that loop 108 rotates in response to the rotation of sleeve 107, as will be discussed in more detail below.

In operation, an elongate member 115 is coupled to gate assembly 104 so that gate assembly 104 can be moved between the closed and opened conditions in response to applying a force (FIG. 1d) to elongate member 115. In particular, elongate member 115 is coupled to sleeve 107 so that sleeve 107 can be moved between the biased and unbiased conditions in response to applying the force to elongate member 115. Elongate member 115 extends through body opening 102 and around distal portion 101a to provide more leverage to sleeve 107. Elongate member 115 can be of many different types of elongate members, such as rope and twine. In this particular embodiment, elongate member 115 includes parachute chord, which is less likely to become frayed from repeated use. Elongate member 115 is chosen to have a desired length so that a person can reach it.

Elongate member 115 can be coupled to sleeve 107 in many different ways. In this embodiment, elongate member 115 is coupled to loop 108. Elongate member 115 can be coupled to loop 108 in many different ways. In this embodiment, elongate member 115 is moved through loop 108 and a knot 116 is formed with elongate member 115, wherein knot 116 restricts the ability of elongate member 115 to be moved away from loop 108. Knot 116 engages loop 108 in response to the force applied to elongate member 115, and sleeve 107 rotates in response. As mentioned above, loop 108 rotates in response to the rotation of sleeve 107, as shown in FIG. 1d. Gate assembly 104 moves to the open condition in response to further applying the force to elongate member 115. Gate assembly 104 moves to the closed condition in response to removing the force being applied to elongate member 115. Gate assembly 104 moves to the closed condition because, as mentioned above, gate assembly 104 is a spring-loaded gate assembly.

Figure 2A:
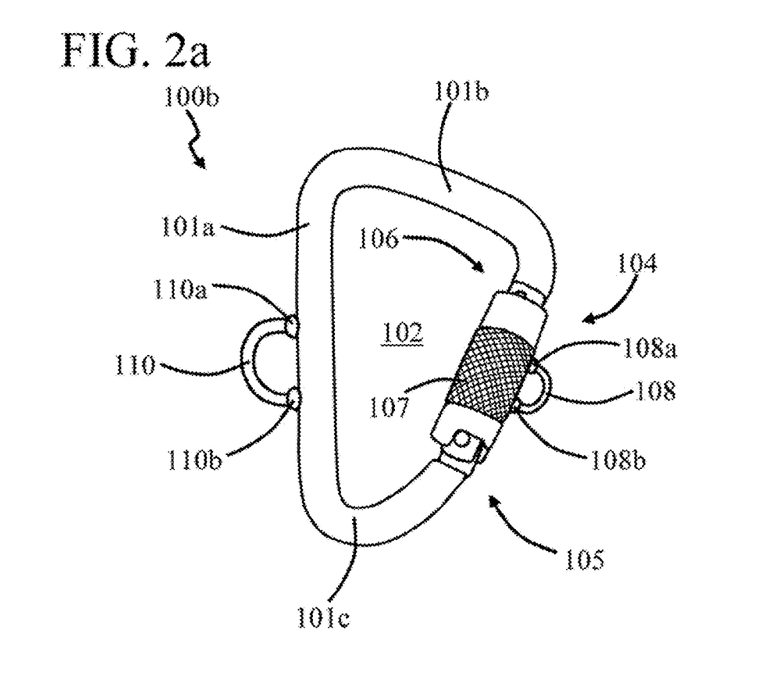
FIGS. 2a and 2b are opposed side views of one embodiment of a carabiner.
Figure 2B:
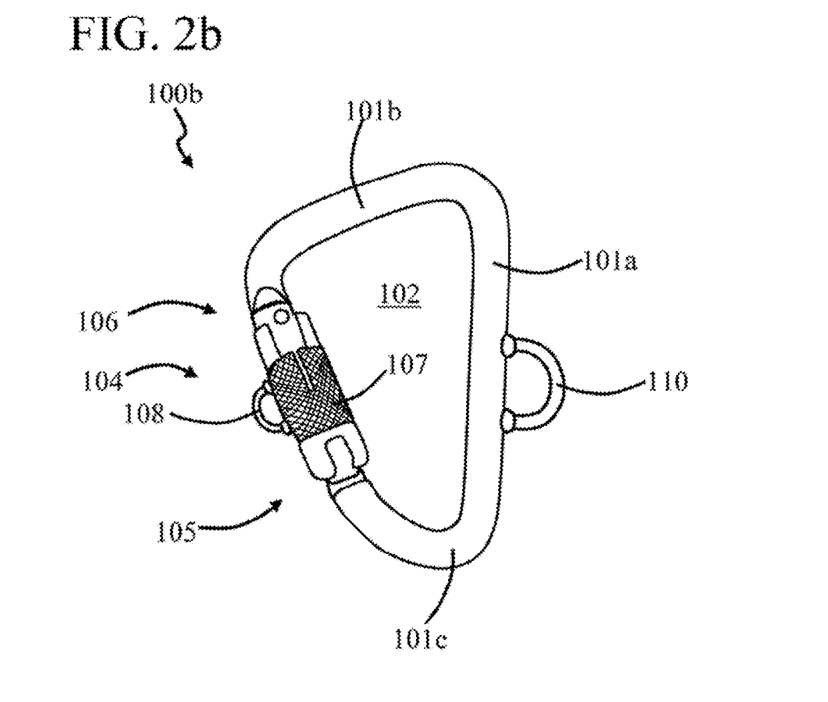
Figure 2C:
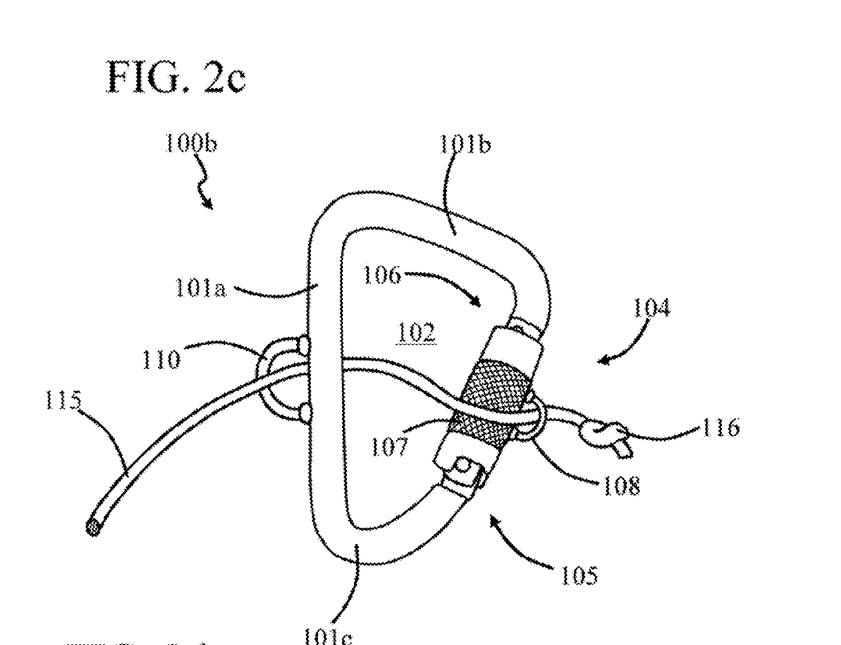
FIGS. 2c and 2d are side views of the carabiner of FIGS. 2a and 2b in closed and open conditions, respectively.
Figure 2D:
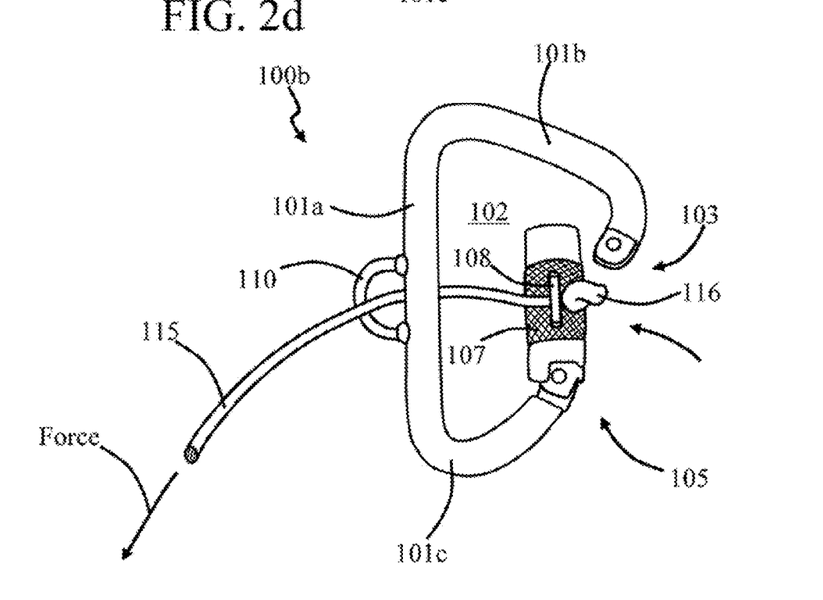

FIGS. 2a and 2b are opposed side views of one embodiment of a carabiner 100b, and FIGS. 2c and 2d are side views of carabiner 100b in closed and open conditions, respectively. It should be noted that carabiner 100b is similar to carabiner 100a. In this embodiment, however, carabiner 100b includes a loop 110, which is carried by carabiner body 101. Loop 110 can be carried at many different positions with carabiner body 101. In this embodiment, loop 110 is coupled to distal portion 101a. In particular, loop 110 is coupled to sleeve 107. Loop 110 can be coupled to distal portion 101a in many different ways. In this embodiment, loop 110 is coupled to distal portion 101a by weldments 110a and 110b. Loop 110 is positioned so it extends away from body opening 102.

In operation, elongate member 115 is coupled to gate assembly 104, as described in more detail above with FIGS. 1c and 1d, so that gate assembly 104 can be moved between the closed and opened conditions in response to applying the force (FIGS. 1d and 2d) to elongate member 115. In particular, elongate member 115 is coupled to sleeve 107 so that sleeve 107 can be moved between the biased and unbiased conditions in response to applying the force to elongate member 115. Elongate member 115 extends through body opening 102 and around distal portion 101a to provide more leverage to sleeve 107. Elongate member 115 extends through loop 110 to hold the portion of elongate member 115 in place proximate to distal portion 101a in place. In this way, elongate member 115 can provide more leverage to sleeve 107.

Figure 3A:
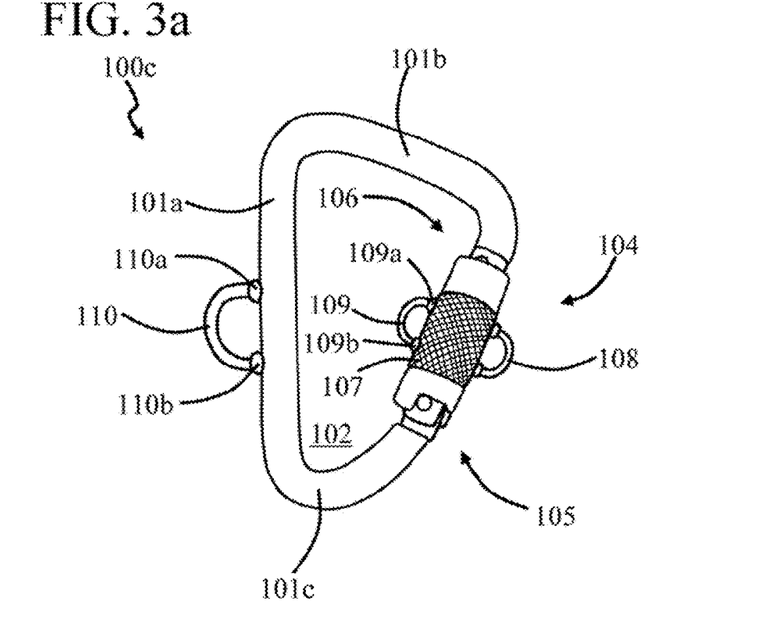
FIGS. 3a and 3b are opposed side views of one embodiment of a carabiner.
Figure 3B:
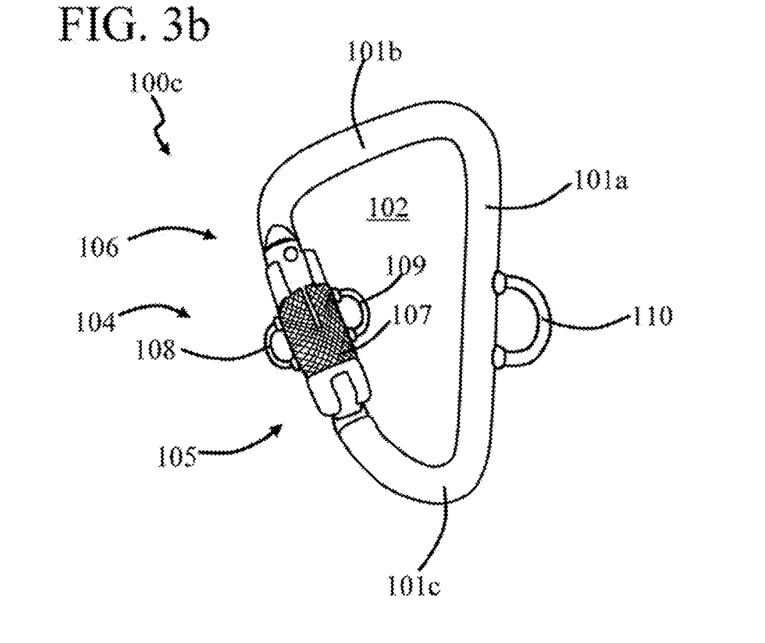
Figure 3C:
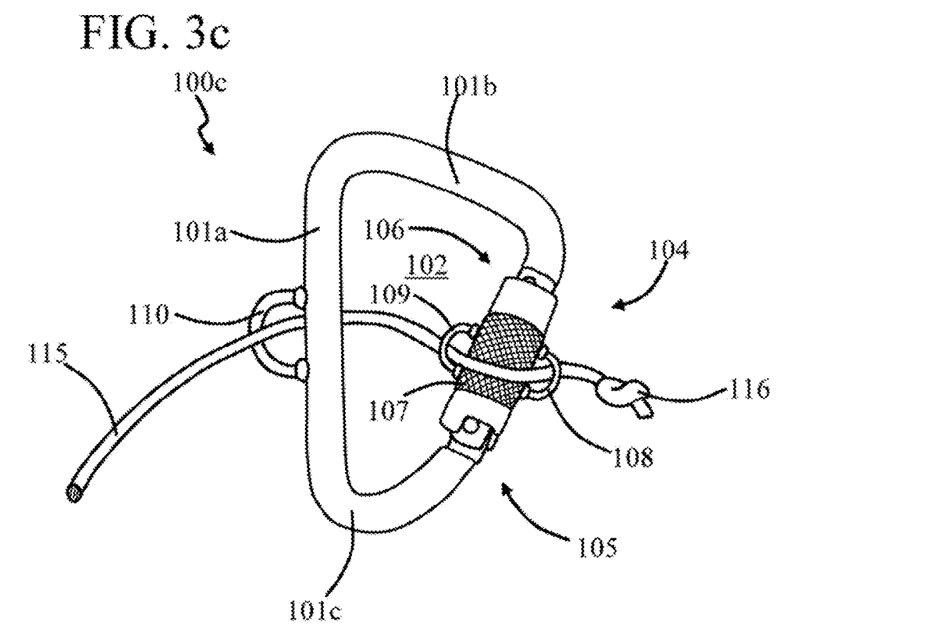
FIGS. 3c and 3d are side views of the carabiner of FIGS. 3a and 3b in closed and open conditions, respectively.
Figure 3D:
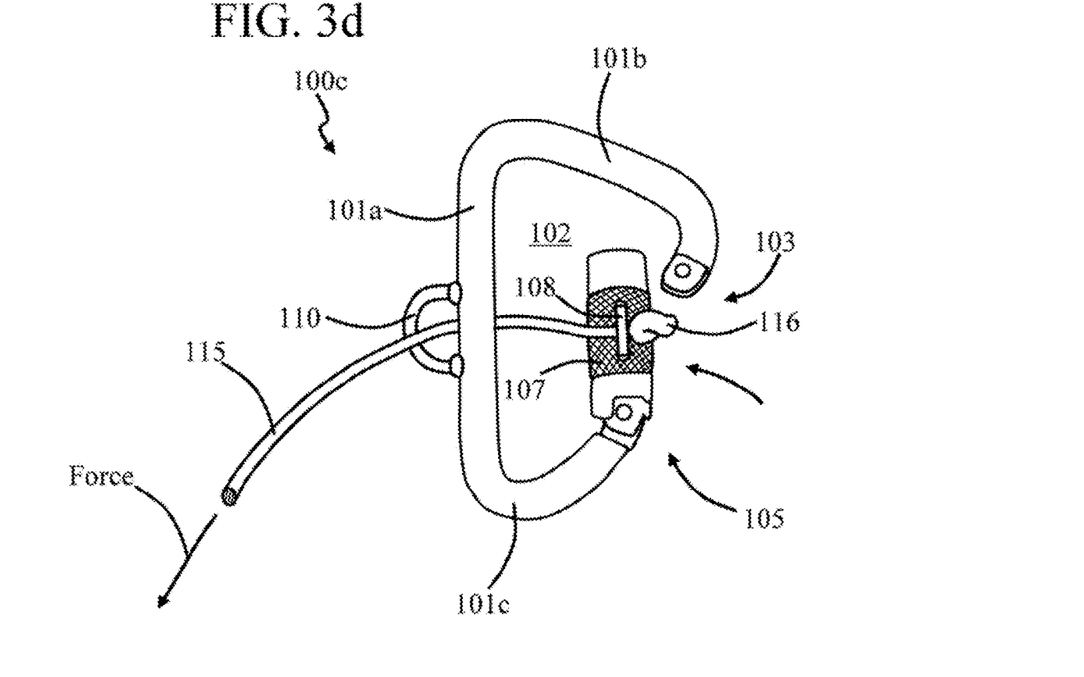

FIGS. 3a and 3b are opposed side views of one embodiment of a carabiner 100c, and FIGS. 3c and 3d are side views of carabiner 100c in closed and open conditions, respectively. It should be noted that carabiner 100c is similar to carabiner 100b and includes loops 108 and 110, as described in more detail above. In this embodiment, however, carabiner 100c includes a loop 109, which is carried by gate assembly 104. Loop 109 can be carried at many different positions. In this embodiment, loop 109 is coupled to gate assembly 104. In particular, loop 109 is coupled to sleeve 107. Loop 109 can be coupled to sleeve 107 in many different ways. In this embodiment, loop 109 is coupled to sleeve 107 by weldments 109a and 109b. Loop 109 is positioned so it extends through body opening 102. In particular, loop 109 is positioned so that it is opposed to loop 108. It should be noted that loops 108 and 109 rotate in response to the rotation of sleeve 107, as will be discussed in more detail below.

In operation, elongate member 115 is coupled to gate assembly 104, as described in more detail above with FIGS. 1c and 1d and FIGS. 2c and 2d, so that gate assembly 104 can be moved between the closed, and opened conditions in response to applying the force (FIGS. 1d, 2d and 3d) to elongate member 115. In particular, elongate member 115 is coupled to sleeve 107 so that sleeve 107 can be moved between the biased and unbiased conditions in response to applying the force to elongate member 115. Knot 116 engages loop 108 in response to the force applied to elongate member 115, and sleeve 107 rotates in response. As mentioned above, loop 108 rotates in response to the rotation of sleeve 107, as shown in FIG. 3d.

Elongate member 115 extends through loop 109 and around the outer periphery of sleeve 107 to provide more leverage to sleeve 107. Elongate member 115 extends through loop 109 to hold the portion of elongate member 115 in place proximate to sleeve 107 in place.

Elongate member 115 extends through body opening 102 and around distal portion 101a to provide more leverage to sleeve 107. Elongate member 115 extends through loop 110 to hold the portion of elongate member 115 in place proximate to distal portion 101a in place.

Figure 4A:
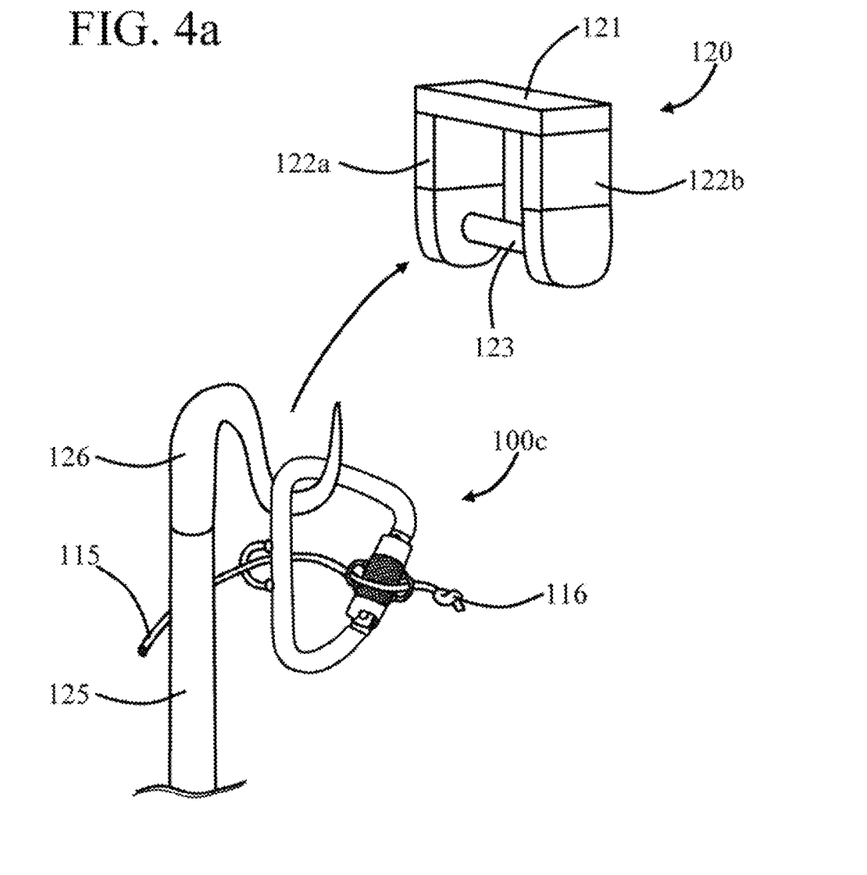
FIGS. 4a, 4b and 4c are perspective views of the carabiner of FIGS. 3a and 3b being hoisted to a support structure.
Figure 4B:
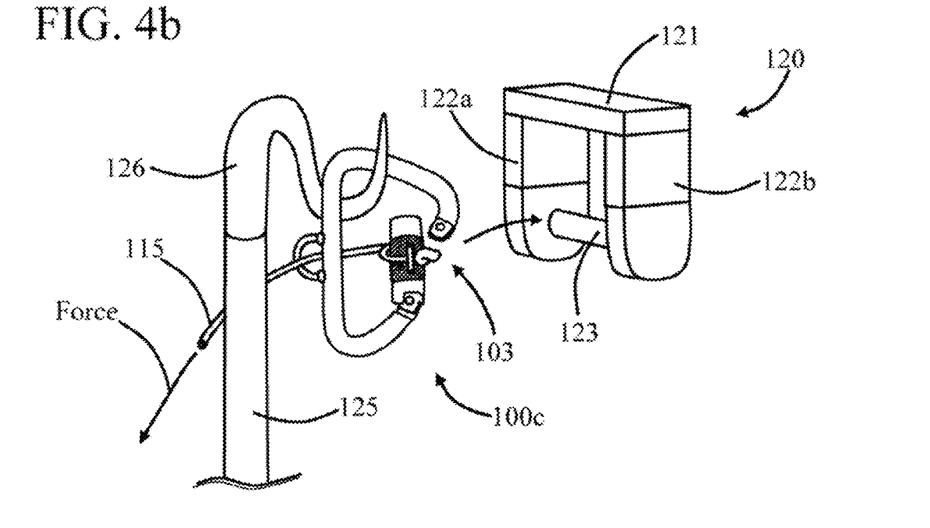
Figure 4C:
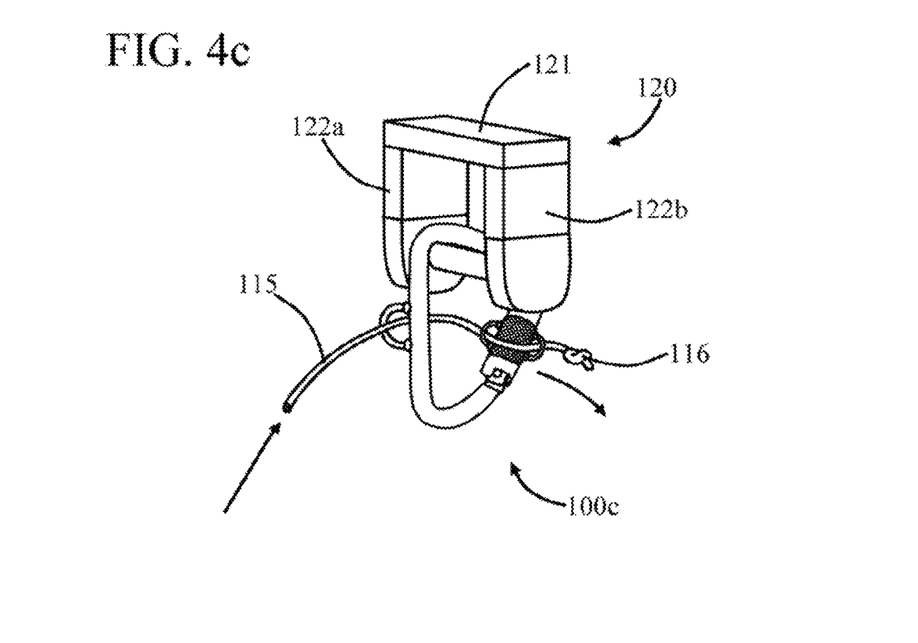

FIGS. 4a, 4b and 4c are perspective views of carabiner 100c of FIGS. 3a and 3b being hoisted to a support structure 120 with a pole 125. In this embodiment, pole 125 carries a hook 126, and carabiner 100c is carried by extending hook 126 through body opening 102 (FIGS. 3c-3d). It should be noted that elongate member 115 extends along the length of pole 125 so that the person holding pole 125 can also hold elongate member 115.

In this embodiment, support structure 120 includes a support plate 121 with opposed support legs 122a and 122b extending downwardly therefrom. Support structure 120 includes of support arm 123 which extends between support legs 122a and 122b. It should be noted that support structure 120 is typically attached to another structure, such as a ceiling.

In operation, carabiner 100c is hoisted upwardly with pole 125 so that it is moved toward support structure 120, as shown in FIG. 4b. The force is applied to elongate member 115 so that gate assembly 104 moves from the closed condition (FIG. 4a to the open condition (FIG. 4b), as described in more detail above with FIGS. 3a-3d. Support arm 123 is extended through body mouth 103 (FIG. 4b) and the force is removed from elongate member 115. Gate assembly 104 moves from the open condition to the closed condition in response to removing the force from elongate member 115, as shown in FIG. 4c. In this way, carabiner 100c is coupled to support structure 120 using a pole. It should be noted that carabiner 100c can be replaced with carabiners 100a and 100b, if desired. The use of carabiner 100c in FIGS. 4a, 4b and 4c is for illustrative purposes.

Figure 5:
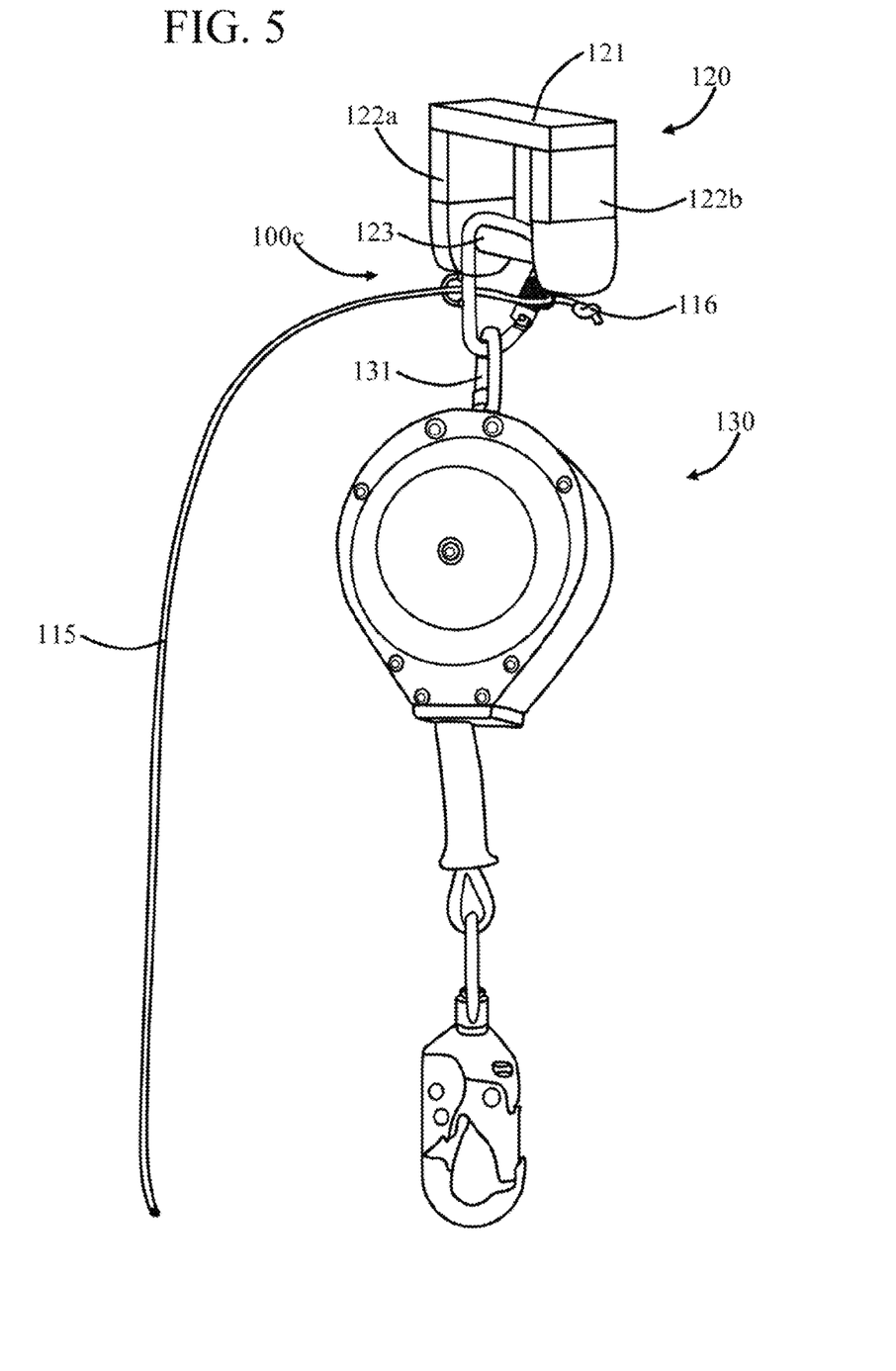
FIG. 5 is a perspective view of the carabiner of FIGS. 2a and 2b coupling a retractable lifeline safety device to the support structure of FIGS. 4a, 4b and 4c.

FIG. 5 is a perspective view of carabiner 100b of FIGS. 2a and 2b coupling a retractable lifeline safety device 130 to support structure 120 of FIGS. 4a, 4b and 4c. In this embodiment, retractable lifeline safety device 130 includes a ring 131, which is coupled to carabiner 100b. Carabiner 100b is coupled to support structure 120, as described in more detail above with FIGS. 4a, 4b and 4c. In this way, retractable lifeline safety device 130 and carabiner 100c are coupled to support structure 120 using a pole.

Figure 6A:
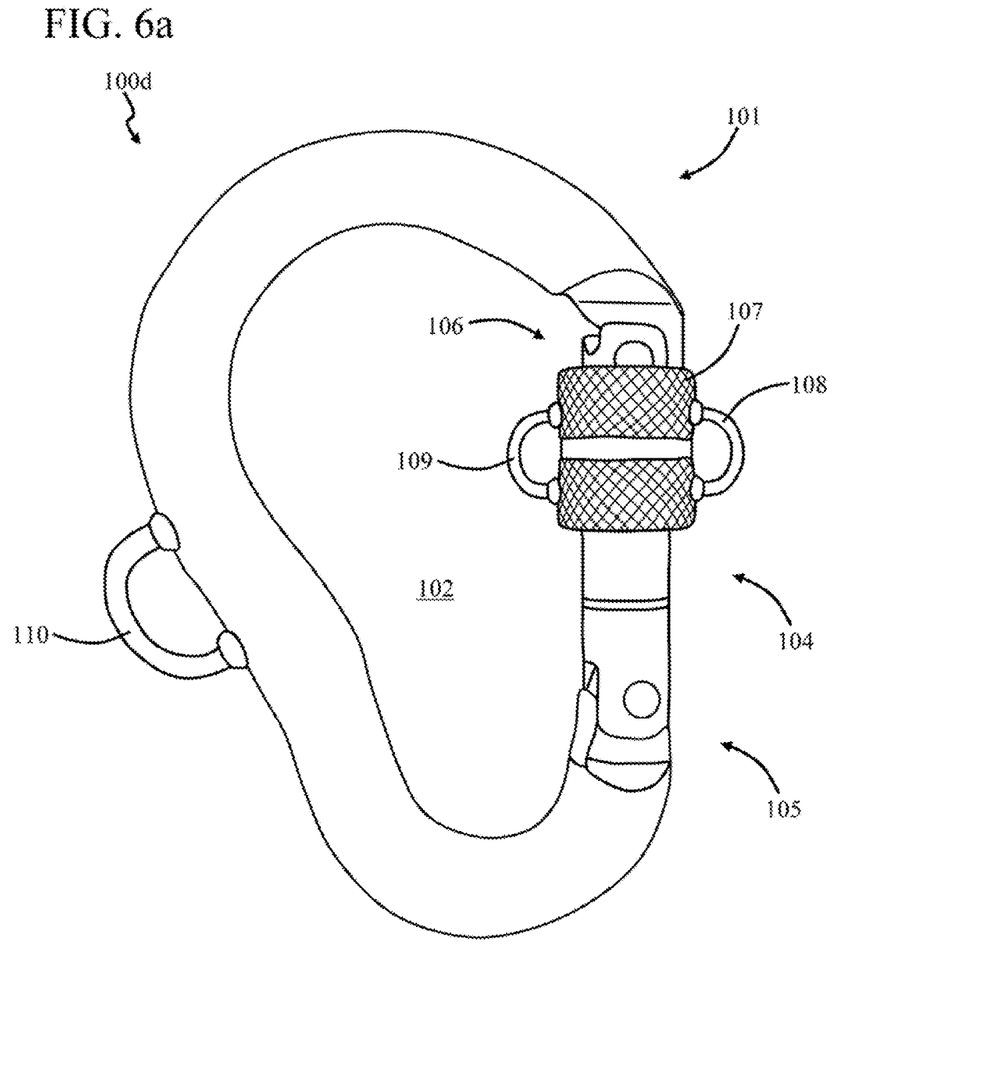
FIGS. 6a and 6b are perspective views of a screw gate pear-shaped carabiner and screw gate D-shaped carabiner, respectively.

FIG. 6a is a perspective view of a screw gate pear-shaped carabiner 100d. In this embodiment, screw gate pear-shaped carabiner 100d includes loops 108, 109 and 110, which are described in more detail above. It should be noted that screw gate pear-shaped carabiner 100d can include any combination of loops 108, 109 and 110, if desired. For example, in some embodiments, screw gate pear-shaped carabiner 100d includes loop 108 coupled to sleeve 107. In other embodiments, screw gate pear-shaped carabiner 100d includes loops 108 and 109 coupled to sleeve 107.

Figure 6B:
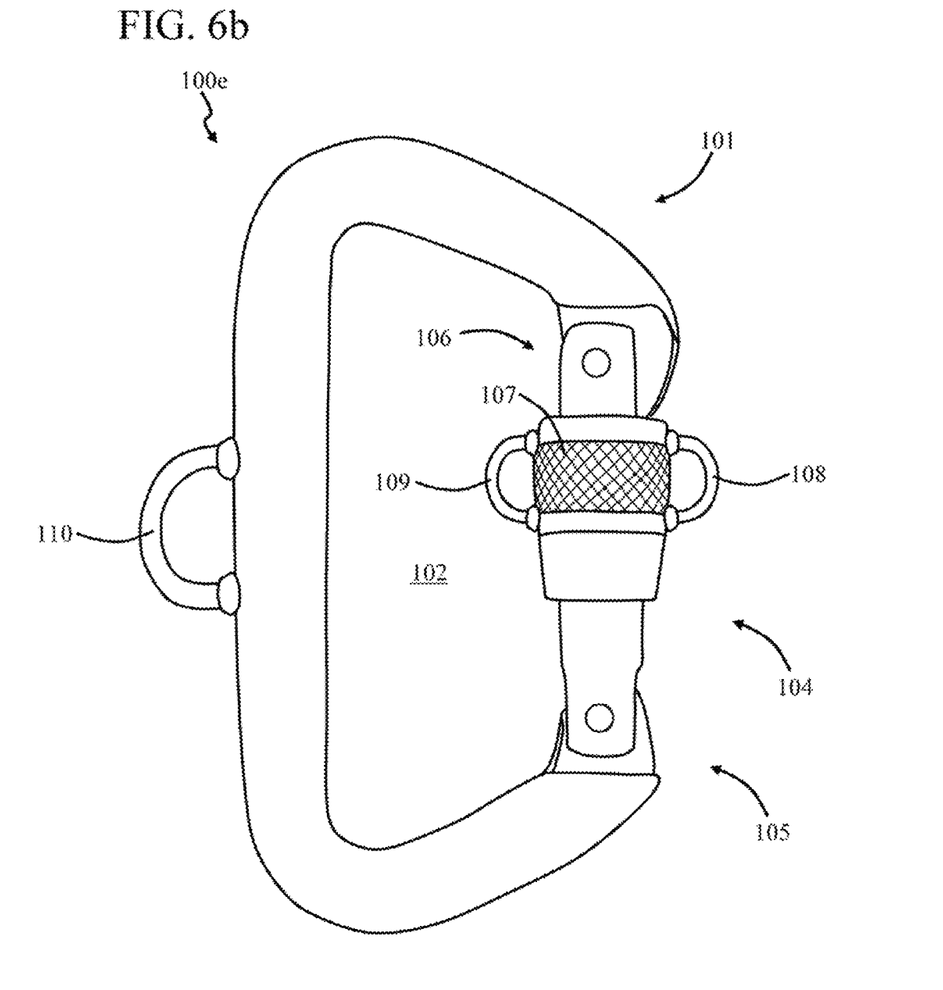

FIG. 6a is a perspective view of a screw gate D-shaped carabiner 100e, respectively. In this embodiment, screw gate D-shaped carabiner 100e includes loops 108, 109 and 110, which are described in more detail above. It should be noted that screw gate D-shaped carabiner 100e can include any combination of loops 108, 109 and 110, if desired. For example, in some embodiments, screw gate D-shaped carabiner 100e includes loop 108 coupled to sleeve 107. In other embodiments, screw gate D-shaped carabiner 100e includes loops 108 and 109 coupled to sleeve 107.

Figure 7A:
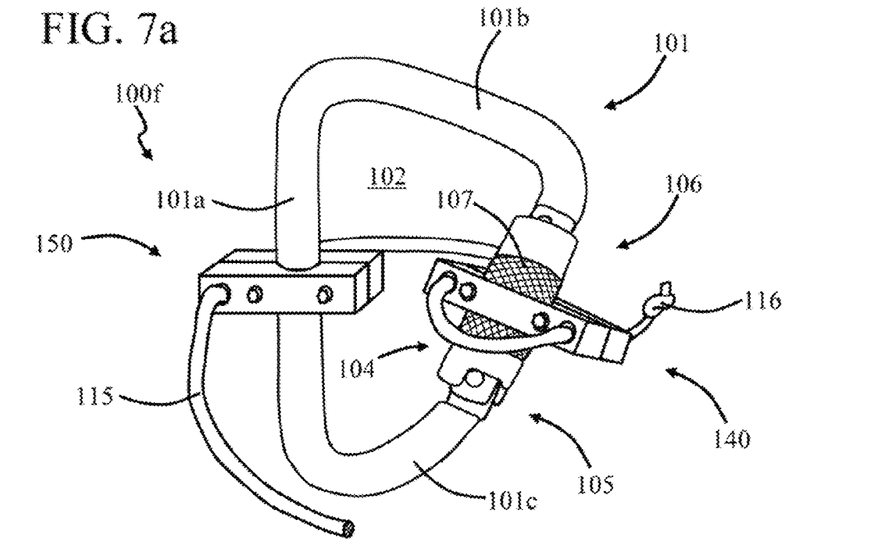
FIGS. 7a and 7b are side views of another embodiment of a carabiner in closed and open conditions, respectively, wherein the carabiner includes a sleeve bracket and stationary bracket.
Figure 7B:
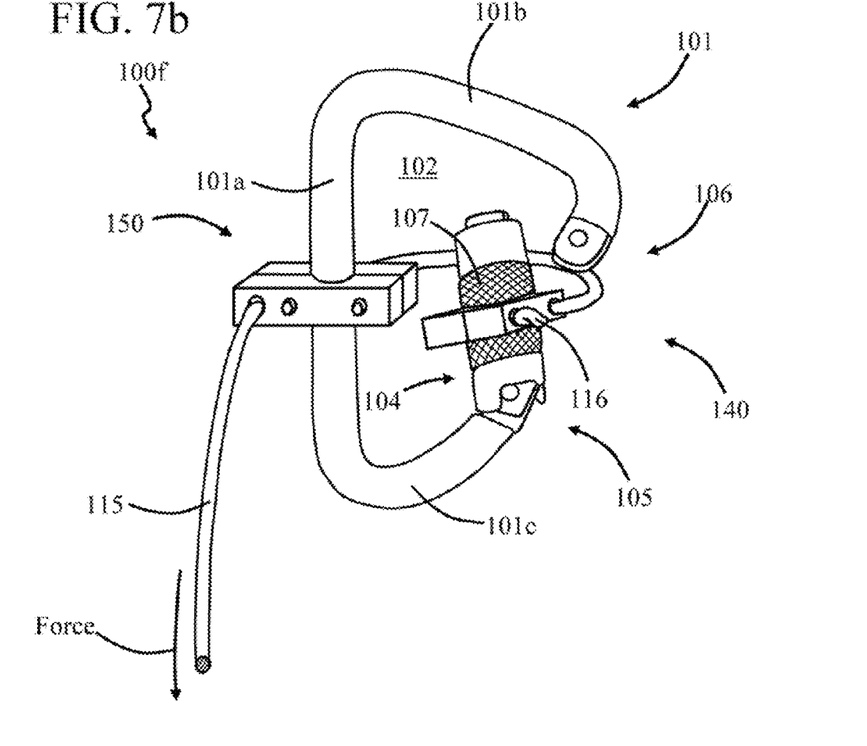

FIGS. 7a and 7b are side views of another embodiment of a carabiner 100f in closed and open conditions, respectively. In this embodiment, carabiner 100f includes a sleeve bracket 140 and stationary bracket 150, wherein sleeve bracket 140 is repeatably moveable between coupled and uncoupled conditions with gate assembly 104. In particular, sleeve bracket 140 is repeatably moveable between coupled and uncoupled conditions with sleeve 107. Sleeve bracket 140 can be repeatably moveable between coupled and uncoupled conditions with sleeve 107 in many different ways, as will be discussed in more detail below with FIGS. 8a-8d.

In this embodiment, stationary bracket 150 is repeatably moveable between coupled and uncoupled conditions with carabiner body 101. In particular, stationary bracket 150 is repeatably moveable between coupled and uncoupled conditions with distal portion 101a. Stationary bracket 150 can be repeatably moveable between coupled and uncoupled conditions with distal portion 101a in many different ways, as will be discussed in more detail below with FIGS. 9a-9d.

Sleeve bracket 140 and stationary bracket 150 are useful because they can be coupled to many different types of carabiner bodies, such as those discussed in more detail above, without having to modify the carabiner body. For example, some of the embodiments discussed above require a loop to be welded to the carabiner, which may weaken the carabiner body material.

Figure 8A:
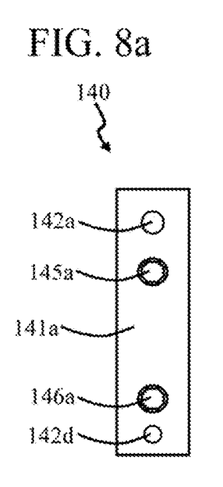
FIGS. 8a, 8b, 8c and 8d are various views of the sleeve bracket of FIGS. 7a and 7b.
Figures 8B, 8C:
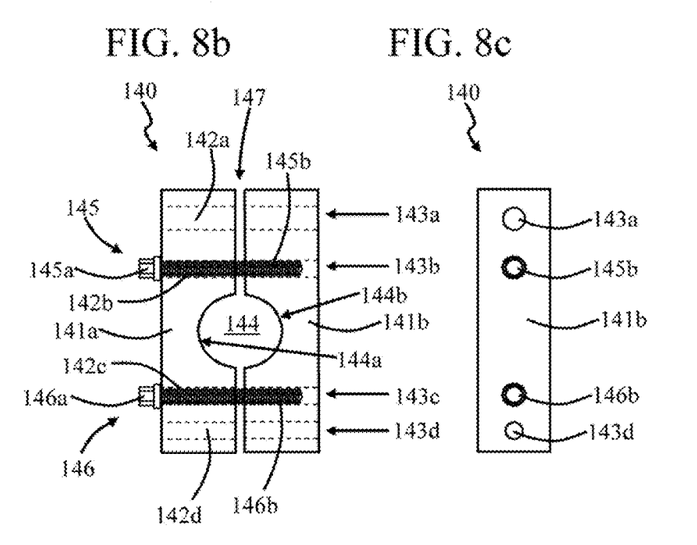
Figure 8D:
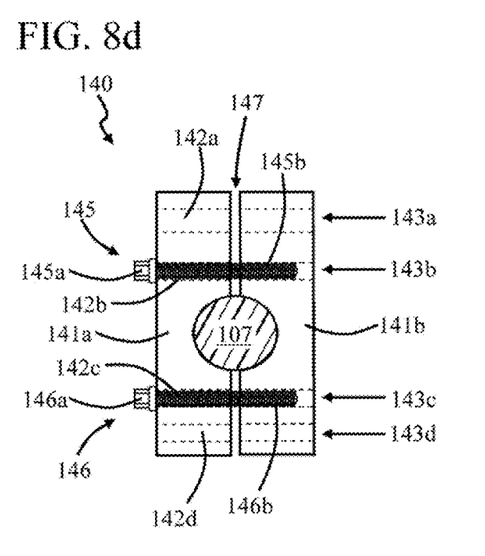

FIGS. 8b and 8d are top views of sleeve bracket 140 of FIGS. 7a and 7b, and FIGS. 8a and 8c are opposed side views of sleeve bracket 140. In this embodiment, sleeve bracket 140 includes sleeve bracket bodies 141a and 141b, wherein sleeve bracket body 141a includes a curved surface 144a, which faces sleeve bracket body 141b (FIG. 5b). Openings 142a, 142h. 142c and 142d extend through sleeve bracket body 141a, wherein openings 142a and 142b are on one side of curved surface 144a and openings 142c and 142d are on an opposed side of curved surface 144a.

In this embodiment, sleeve bracket body 141b includes a curved surface 144b, which faces sleeve bracket body 141a (FIG. 8b). It should be noted that curved surfaces 144a and 144b are positioned so that they face each other, as shown in FIG. 8b. Curved surfaces 144a and 144b are sized and shaped to receive sleeve 107, as shown in FIG. 8d. Openings 143a, 143b, 143c and 143d extend through sleeve bracket body 141b, wherein openings 143a and 143b are on one side of curved surface 144b and openings 143c and 143d are on an opposed side of curved surface 144b.

Sleeve bracket 140 includes a fastener 145 having a head 145a and a shaft 145b. Fastener 145 is positioned so that shall 145b extends through openings 142b and 143b so that sleeve, bracket bodies 141a and 141b are coupled together. Sleeve bracket 140 includes a fastener 146 having a head 146a and a shaft 146b. Fastener 146 is positioned so that shaft 146b extends through openings 142c and 143c so that sleeve bracket bodies 141a and 141b are fastened together.

It should be noted that, in this embodiment, sleeve bracket bodies 141a and 141b are spaced apart from each other so that there is a gap 147 (FIGS. 8b and 8d) between them. However, sleeve bracket bodies 141a and 141b are held against sleeve 107, as shown in FIG. 8d, so that sleeve bracket 140 is frictionally engaged with gate assembly 104. Sleeve bracket 140 is frictionally engaged with gate assembly 104 so that gate assembly 104 rotates in response to the rotation of sleeve 107.

Figures 9A, 9B, 9C:
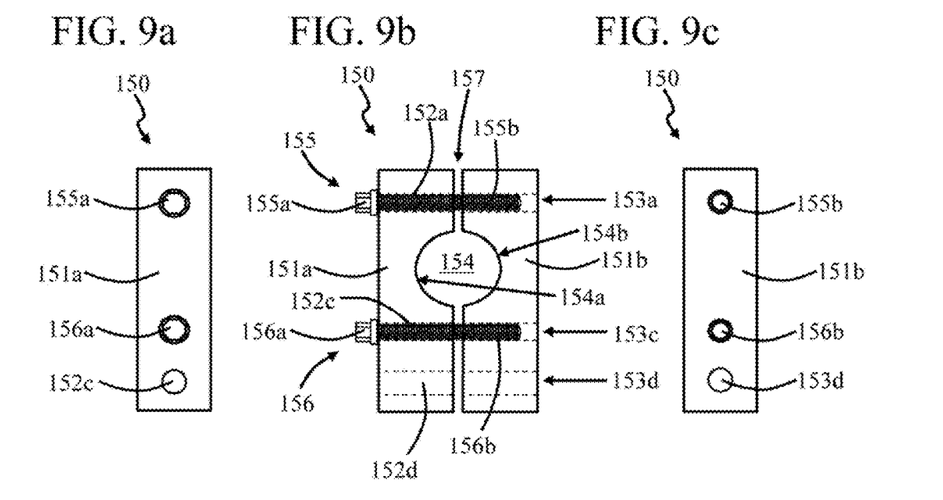
FIGS. 9a, 9b, 9c and 9d are various views of the stationary bracket of FIGS. 7a and 7b.
Figure 9D:
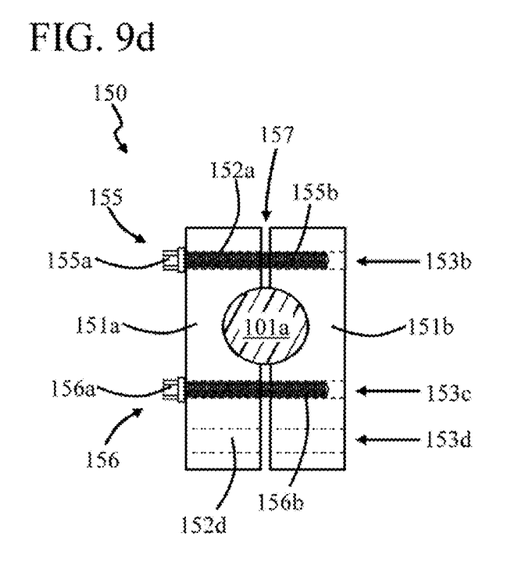

FIGS. 9b and 9d are top views of stationary bracket 150 of FIGS. 7a and 7b, and FIGS. 9a and 9c are opposed side views of stationary bracket 150. In this embodiment, stationary bracket 150 includes stationary bracket bodies 151a and 151b, wherein stationary bracket body 151a includes a curved surface 154a, which faces stationary bracket body 151b (FIG. 8b). Openings 152a, 152b. 152c and 152d extend through stationary bracket body 151a, wherein openings 152a and 152b are on one side of curved surface 154a and openings 152c and 152d are on an opposed side of cured surface 154a.

In this embodiment, stationary bracket body 151b includes a curved surface 154b, which faces stationary bracket body 151a (FIG. 9b). It should be noted that curved surfaces 154a and 154b are positioned so that they face each other, as shown in FIG. 9b. Curved surfaces 154a and 154b are sized and shaped to receive distal portion 101a, as shown in FIG. 9d. Openings 153a, 153b. 153c and 153d extend through stationary bracket body 151b, wherein openings 153a and 153b are on one side of curved surface 154b and openings 153c and 153d are on an opposed side of curved surface 154b.

Stationary bracket 150 includes a fastener 155 having a head 155a and a shaft 155b. Fastener 155 is positioned so that shall 155b extends through openings 1521) and 153b so that stationary bracket bodies 151a and 151b are coupled together. Stationary bracket 150 includes a fastener 156 having a head 156a and a shall 156b. Fastener 156 is positioned so that shall 156b extends through openings 152c and 153c so that stationary bracket bodies 151a and 151b are fastened together.

It should be noted that, in this embodiment, stationary bracket bodies 151a and 151b are spaced apart from each other so that there is a gap 157 (FIGS. 9b and 9d) between them. However, stationary bracket bodies 151a and 151b are held against distal portion 101a, as shown in FIG. 9d, so that stationary bracket 150 is frictionally engaged with distal portion 101a. Stationary bracket 150 is frictionally engaged with distal portion 101a so that it does not rotate in response to the rotation of stationary 107.

In operation, sleeve bracket bodies 141a and 141b are positioned at opposed sides of sleeve 107, as shown in FIG. 8d, so that openings 142a, 142b, 142c and 142d are aligned with openings 143a, 143b, 143c and 143d. Fastener 145 is extended through openings 142b and 143b, and fastener 146 is extended through openings 142c and 143c so that sleeve bracket bodies 141a and 141b are fastened together. Fasteners 145 and 146 are threaded through sleeve bracket bodies 141a and 141b so that gap 147 is formed therebetween.

Stationary bracket bodies 151a and 151b are positioned at opposed sides of distal portion 101a, as shown in FIG. 9d, so that openings 152a, 152c and 152d are aligned with openings 153a, 153c and 151d. Fastener 155 is extended through openings 152a and 153a, and fastener 156 is extended through openings 152c and 153c so that sleeve bracket bodies 151a and 151b are fastened together. Fasteners 155 and 156 are threaded through sleeve bracket bodies 151a and 151b so that gap 157 is formed therebetween.

Elongate member 115 is extended through openings 142d and 143d, as well as through openings 142a and 143a, as shown in FIGS. 7a and 7b. Elongate member 115 extends through body opening 102 when it extends through openings 142a and 143a. Elongate member 115 includes knot 116, which is positioned proximate to opening 143d and away from body opening 102. Elongate member 115 is extended through openings 152d and 153d, as shown in FIGS. 7a and 7b.

Sleeve 107 rotates in response to applying a force to elongate member 115 because knot 116 engages sleeve bracket body 141b. Gate assembly 104 moves from the closed condition (FIG. 7a) to the open condition (FIG. 7b) in response to knot 116 engaging sleeve bracket body 141b. Gate assembly 104 moves from the open condition (FIG. 7b) to the closed condition (FIG. 7a) in response to releasing the force applied to elongate member 115. In this way, gate assembly 104 moves between the open and closed conditions in response to applying a force to elongate member 115 and releasing the force.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A carabiner, comprising:
   a carabiner body;
   a gate assembly coupled to the carabiner body;
   a sleeve bracket, which includes first and second sleeve bracket bodies coupled to the gate assembly;
   a stationary bracket, which includes first and second stationary bracket bodies coupled to a distal portion of the carabiner body;
   an elongate member which extends through the sleeve bracket and stationary bracket, wherein the gate assembly is moveable between open and closed conditions in response to a force applied to the elongate member.

2. The carabiner of claim 1, wherein the first and second sleeve bracket bodies are spaced apart from each other, and frictionally engaged with the gate assembly.

3. The carabiner of claim 2, wherein the first and second sleeve bracket bodies are coupled together with a fastener.

4. The carabiner of claim 1, wherein the first and second stationary bodies are spaced apart from each other and frictionally engaged with the distal portion of the carabiner body.

5. The carabiner of claim 4, wherein the first and second stationary bracket bodies are coupled together with a fastener.

6. The carabiner of claim 1, wherein the elongate member extends through first and second openings of the first sleeve bracket body.

7. The carabiner of claim 6, wherein the elongate member extends through first and second openings of the second sleeve bracket body.

8. The carabiner of claim 7, wherein the first openings of the first and second sleeve bracket bodies are aligned, and the second openings of the first and second sleeve bracket bodies are aligned.

9. The carabiner of claim 8, wherein the donate member extends through first openings of the first and second stationary bracket bodies.

10. A carabiner, comprising:
    a carabiner body;
    a gate assembly coupled to the carabiner body;
    a sleeve bracket which includes first and second sleeve bracket bodies coupled together with a first fastener, wherein the first and second sleeve bracket bodies are coupled to the gate assembly;
    a stationary bracket which includes first and second stationary bracket bodies coupled together with a second fastener, wherein the first and second stationary bracket bodies are coupled to a distal portion of the carabiner body;
    an elongate member which extends through the sleeve bracket and stationary bracket, wherein the gate assembly is moveable between open and closed conditions in response to a force applied to the elongate member.

11. The carabiner of claim 10, wherein the first and second sleeve bracket bodies each include curved surfaces which face each other and frictionally engage the gate assembly.

12. The carabiner of claim 10, wherein the first and second sleeve bracket bodies are spaced apart from each other, and frictionally engaged with the gate assembly.

13. The carabiner of claim 10, wherein the first and second stationary bodies are spaced apart from each other and frictionally engaged with the distal portion of the carabiner body.

14. The carabiner of claim 10, wherein the elongate member extends through first and second openings of the first sleeve bracket body.

15. The carabiner of claim 14, wherein the first and second openings are positioned on opposed sides of the gate assembly.

16. The carabiner of claim 15, wherein the elongate member extends through first and second openings of the second sleeve bracket body.

17. The carabiner of claim 16, wherein the first openings of the first and second sleeve bracket bodies are aligned, and the second openings of the first and second sleeve bracket bodies are aligned.

18. The carabiner of claim 17, wherein the elongate member extends through first openings of the first and second stationary bracket bodies, the first openings of the first and second stationary bracket bodies being aligned with each other.

19. The carabiner of claim 10, wherein the gate assembly includes a sleeve which rotates in response to rotation of the sleeve bracket.

* * * * *